United States Patent
Liu

(10) Patent No.: US 8,420,177 B2
(45) Date of Patent: Apr. 16, 2013

(54) METHOD FOR PREPARING FUNCTIONAL MULTILAYER ANISOTROPIC CONDUCTIVE ADHESIVE FILM

(76) Inventor: Ping Liu, Shenzhen (CN)

( * ) Notice: Subject to any disclaimer, the term of this patent is extended or adjusted under 35 U.S.C. 154(b) by 0 days.

(21) Appl. No.: 13/547,075

(22) Filed: Jul. 12, 2012

(65) Prior Publication Data

US 2012/0276284 A1   Nov. 1, 2012

Related U.S. Application Data

(62) Division of application No. 12/137,868, filed on Jun. 12, 2008, now Pat. No. 8,241,750.

(30) Foreign Application Priority Data

Apr. 29, 2008   (CN) .......................... 2008 1 0066895

(51) Int. Cl.
- *B05D 1/36* (2006.01)
- *B05D 7/00* (2006.01)
- *B32B 9/00* (2006.01)
- *B32B 33/00* (2006.01)

(52) U.S. Cl.
USPC ..................................... 427/407.1; 428/40.1

(58) Field of Classification Search ................. 427/407.1
See application file for complete search history.

(56) References Cited

U.S. PATENT DOCUMENTS

| | | | |
|---|---|---|---|
| 4,113,981 A | 9/1978 | Fujita et al. | |
| 4,737,112 A | 4/1988 | Jin et al. | |
| 5,180,888 A | 1/1993 | Sugiyama et al. | |
| 5,240,761 A * | 8/1993 | Calhoun et al. | 428/148 |
| 2003/0051807 A1 * | 3/2003 | Yamaguchi et al. | 156/272.2 |
| 2006/0141381 A1 | 6/2006 | Yoshino et al. | |
| 2007/0040153 A1 * | 2/2007 | Jung et al. | 252/500 |

FOREIGN PATENT DOCUMENTS

| | | |
|---|---|---|
| CN | 1307625 | 8/2001 |
| CN | 1605381 | 4/2005 |
| JP | 03129607 | 12/1991 |
| JP | 08325543 | 12/1996 |
| JP | 09031419 | 2/1997 |
| JP | 2000178511 | 6/2000 |
| JP | 2001171033 | 6/2001 |
| WO | WO2006/110634 | 10/2006 |
| WO | WO 2006110634 A2 * | 10/2006 |

* cited by examiner

*Primary Examiner* — Katherine A Bareford
*Assistant Examiner* — James M Mellott

(57) ABSTRACT

A functional multilayer anisotropic conductive adhesive film, capable of bonding and package 0.18-0.13 micron IC chips and high density COF, includes a monomer layer, a reinforcing layer, a low-temperature, hot-melt resin layer, and a conductive particle layer, successively bonded by coating and drying processes. The monomer layer comprises a copolymer of butyl acrylate, methyl acrylate, glycol acrylate, and tetramethyl butyl peroxy-2-ethyl hexanoate. The reinforcing layer comprises long chain imidazole derivatives. The hot-melt resin layer comprises polymer of tocopheroxyl, novolac epoxy, acrylic rubbers and elastic mixture of acrylic rubbers and styrene-butadiene rubbers. The conductive particle layer comprises conductive particles and micro-encapsulating resin for receiving the conductive particles. Diameter of the conductive particles is selected from the group consisting of 3.00 μm ±0.05, 3.25 μm±0.05, 3.50 μm±0.05, 3.75 μm±0.05 and 4.00 μm±0.05.

8 Claims, No Drawings

METHOD FOR PREPARING FUNCTIONAL MULTILAYER ANISOTROPIC CONDUCTIVE ADHESIVE FILM

CROSS REFERENCE TO RELATED APPLICATIONS

This application is a divisional application of U.S. Ser. No. 12/137,868, now U.S. Pat. No. 8,241,750, filed on Jun. 12, 2008. The contents of U.S. application Ser. No. 12/137,868, now U.S. Pat. No. 8,241,750, are all hereby incorporated by reference.

BACKGROUND

1. Technical Field

The present application generally relates to a copolymer resin, more particularly the present application relates to an improved functional multilayer anisotropic conductive adhesive film (ACAF) and its preparation method.

2. Related Art

A need for reduced weight and thickness has recently arose in connection with electronic equipment and devices containing mounted IC chips because of new developments related to such electronic equipment, and there is also a need of functional connection stuffs for higher density in boards for mounting such IC chips. For example, in order to set micro fillets directly engaged with IC chips, flexibility of the connection stuffs is necessary for higher density in boards for mounting such IC chips, thus anisotropic conductive film (ACF) is applied for this purpose. For the moment, ACF market scale is over 20 billions, and playing an important role in social development.

During research and development of the ACF, in a typical pencil anisotropic conductive film, fillet distance and fillet width is about 100 microns. TAP and COG apply different adhesive resins, coupling agents, and silicon powder fillers, which is disclosed in Japan Patents, JP03129607, JP08325543, and JP0931419. Other conventional preparation method for ACF is disclosed in patents, such as CN99807810.7, U.S. Pat. Nos. 5,240,761, 4,113,981, 5,180,888 and 4,737,112, which says that: defining a plurality of dimples on a resin film, placing conductive balls in dimples and then carrying coating process, thereby forming films demanded.

Assembling component without punching and welding is the key to realize high density fillet deployment, high speed connection and ultrathin assembly goals. However, on condition that fillet width of IC chips to be connected is about 100 microns, the conventional ACF can barely meet such connection needs. Therefore anisotropic conductive adhesive films (ACAF) play an important role in connection between IC chips or IC chips based on transparent substrates and high density FPC or COF. Researches on ACAF synchronizing with development of IC chips focus on optimum preparation processes and stuff preparation so as to improve connection property and lower cost. Meanwhile development of ACAF will facilitate expansion of LCD market.

A typical ACF can refer to multilayer or two layer ACF, adopting layer to layer affixing means which is disclosed in Japan application No. 2001171033, it says first and second layers are tapes formed by coating process with resins in different proportion. Furthermore, Japan application No. 2001178511 discloses that four coating processes are presented, a typical ACF is formed with first multilayer anisotropic conductive adhesive layer, second insulating layer, third anisotropic conductive adhesive layer, and fourth insulating layer. However, ACF obtained from the conventional preparation means mentioned above can hardly meet chip connection needs on condition that chip fillet width is 10 microns.

In light of the foregoing, there is a very desirable need to improve the typical anisotropic conductive adhesive film.

SUMMARY

In general, the systems and methods of the application have several features, no single one of which is solely responsible for its desirable attributes. Without limiting the scope of the application as expressed by the claims which follow, its more prominent features will now be discussed briefly. After considering this discussion, and particularly after reading the section entitled "Detailed Description of Certain Embodiments", one will understand how the features of the system and methods provide several advantages over traditional anisotropic conductive adhesive films.

In one aspect of the present application, the object of the present application is to provide an improved functional multilayer anisotropic conductive adhesive film capable of connection and package under micro fillet distance and fillet width conditions, such as 0.18 micron, the functional multilayer anisotropic conductive adhesive film of the present application keeps stable insulation between micro electrodes about 10 microns distance.

In order to achieve the object mentioned above, an improved functional multilayer anisotropic conductive adhesive film and corresponding preparation method are disclosed. The anisotropic conductive adhesive film (ACAF) includes a monomer layer, a reinforcing layer, a low-temperature, hot-melt resin layer, and a conductive particle layer, wherein the monomer layer, the reinforcing layer, the resin layer and the conductive particle layer are successively bonded by coating and drying processes. The monomer layer comprises a copolymer of butyl acrylate, methyl acrylate, glycol acrylate, and tetramethyl butyl peroxy-2-ethyl hexanoate. The reinforcing layer comprises long chain imidazole derivatives. The low-temperature, hot-melt resin layer comprises a polymer of tocopheroxyl, novolac epoxy, acrylic rubbers and elastic mixture of acrylic rubbers and styrene-butadiene rubbers. The conductive particle layer comprises conductive particles and a low-temperature, hot-melt, micro-encapsulating resin for receiving the conductive particles, the diameter of the conductive particles selected from the group consisting of 3.00 μm±0.05, 3.25 μm±0.05, 3.50 μm±0.05, 3.75 μm±0.05 and 4.00 μm±0.05.

In the present application, the conductive particles can be Michael Robert (brand) AV conductive particles.

In the polymerization of the low-temperature, hot-melt resin layer, the tocopheroxyl is referred to as YP-70, 10-30 parts by weight. The novolac epoxy is selected from the group consisting of F-55, F-51 and F-44, 10-20 parts by weight. Bulk density of the acrylic rubbers is 0.48±0.1 g/cc, volatility<1.0%, Tg −30° C., solution viscosity under temperature of 25° C. is 5000-10000 mPa·S, 10-20 parts by weight. The styrene-butadiene rubbers have Mooney viscosity of natural rubber ML100° C. (1+4): 45-55%, stretching stress 300% (35 minutes): 14.1-18.6 MPa, tensile strength at a given elongation (35 minutes):>23.7 MPa, and elongation at break (35 minutes)>:415%. The elastic mixture is 5-10 parts by weight. The long chain imidazole derivatives is a synthesis of 2,4-diamino-6-[-2-undecyl imidazolyl (1)]-ethyl-cis-triazine, 1-cyanoethyl-2-undecyl-imidazole trimellitate, and isocyanate derivative; 0.75-5 parts by weight.

The content of the conductive particles is 30-40 parts by weight per 500 parts by total weight of the anisotropic conductive adhesive film.

The solvent in the present application is obtained by mixing toluene and ethyl acetate with a weight ratio of 4:6, and a solution is prepared with the reactant thereof by a weight concentration of 20%-40%.

The monomer in the monomer layer is applied to adjust the viscosity of surface coating layer on the anisotropic conductive adhesive film in accordance with different IC chips, adjust flexibility, rigidity, and preloading curing time. The copolymer in the monomer layer can be applied to other resin solution in terms of composition or tolerance factor of the monomer. Due to small molecular weight distribution range, little oligomer remains and little impurity remains characteristics of the monomer, by introducing functional matrix, together with isocyanate and epoxy ester, viscosity, intensity and waterlogging tolerance of the ACAF is improved, at the same time achieving anti foaming purpose. The content of the monomer in the monomer layer is 5-10 parts by weight per 500 parts by the total weight of the anisotropic conductive adhesive film, wherein the weight ratio of the butyl acrylate, the methyl acrylate, the glycol acrylates, and the tetramethyl butyl peroxy-2-ethyl hexanoate is set in 7:3:2:1 according to the requirement of corresponding chipset.

The long chain imidazole derivatives in the reinforcing layer is obtained by the following processes: mixing the 2,4-diamino-6-[-2-undecyl imidazolyl (1)]-ethyl-cis-triazine, and 1-cyanoethyl-2-undecyl-imidazole trimellitate with a weight ratio of 1:1, keeping them reacting for 3 hours. Use 30 parts by weight reactant from the mixing process, and then heating the reactant from the mixing process up to 50° C., adding 0.8 part by weight toluene-2,4-diisocyanate and 60 parts by weight solvent into the reactant, and keeping them reacting for 5 hours. Because the long chain imidazole derivatives contains a long carbon chain, its storage period is long and it possesses fast curing characteristic under certain temperature and certain time period by applying coating and micro encapsulation technique.

In the present application, the thermal aging property of the elastic mixture is improved by steps of: mixing and preparing the acrylic rubbers and the styrene-butadiene rubbers with weight ratio of 10:5, and then physically admixing trace meta-alkaline reinforcing agent containing silica, silane coupling agent, and quaternary ammonium salt, in accordance with a weight ratio of 1:0.2:0.3. The acrylic rubbers function as an impact modifier to improve shock strength, high thermal stability, and weather fastness. The elastic mixture facilitates the ACAF lowering elastic ratio, buffering stress, improving viscosity, and improving interface effect of the conductive particles in the resin solution, so as to optimize uniform distribution of the conductive particles.

The method for preparing functional multilayer anisotropic conductive adhesive film of the present application, adopting suspension polymerization means, comprises the following steps: according to the above mentioned formula, mixing and stirring tocopheroxyl, novolac epoxy, and a solvent in a reactor until the substances solved in the reactor; then adding and stirring acrylic rubbers and elastic mixture of acrylic rubbers and styrene-butadiene rubbers into the reactant obtained from previous step; and adding acrylic rubbers and a solvent into the admixture obtained from previous step, dissolving and stirring; in the end waiting as viscosity of the polymer naturally reduces to a degree that no more polymerization occurs, thus a coating stuff to be used for the low-temperature, hot-melt resin layer is obtained.

According to the above mentioned formula, stir the long chain imidazole derivatives by a counting stirring machine to form a later use coating stuff for the reinforcing layer.

According to the above mentioned formula, mixing butyl acrylate, methyl acrylate and glycol acrylate in a reactor, under presence of tetramethyl butyl peroxy-2-ethyl hexanoate, a copolymer is formed. After stirring and foam breaking, a coating stuff to be used for the monomer layer is obtained.

A coating stuff to be used for the conductive particle layer, uses conductive particles and low-temperature, hot-melt, micro-encapsulating resin for receiving the conductive particles. In present application, the conductive particles can be Michael Robert (brand) AV conductive particles.

Coating processes are carried out under temperature of 100° C.-135° C. to successively form the conductive particle layer, low-temperature, hot-melt resin layer, the reinforcing layer, and the monomer layer. After 8 minutes, the four layers are coated onto an opal surface-treated polyester film. Roll up the polyester film isolated by an isolating film. After slice the polyester film and re-roll up the polyester film, the functional multilayer anisotropic conductive adhesive film of the present application is obtained.

In the present application, the stirring machine adopts 3D multi-DOF stirring apparatus possessed by the applicant (Patent application No. 200310111757). The stirring machine can set capturing and positioning parameters to adjusting stirring process. The stirring machine can detect viscosity, and render hot-melt resin, elastic mixture resin, monomer mixture solution, and conductive particle paste uniformly distributed, and form a ropy layer on the surface of the ACAF, so as to prepare the anisotropic conductive adhesive film.

The anisotropic conductive adhesive film of the present application can be applied to connect LCD drive IC and high density FPC, downsizing and integrating COF, TAB, COG IC chips, and capable of connecting IC fillets with 0.18 micron fillet distance or fillet width, which results in high production yield. The anisotropic conductive adhesive film of the present application is a microelectronic bonding, packing, and functional connection technique, meeting preparation requirements of resin thermal curing shrinkage, positioning/offset parameters, short circuit and IC damage.

The multiple layered structure of the ACAF of the present application can facilitate bonding, packaging and connection between LCD, semiconductors, IC chips and FPC under 10 microns distance or width. As a low temperature bonding stuff, the ACAF of the present application is lead free and environment protection, popular to be an assembly stuff adapting the environment and facilitating IC cards, high frequency detectors, remote radio electronic labels to be functional and convenient.

In connection between the ACAF of the present application and fillets, resistance splicing sets up connection between protuberant electrodes and circuit, greatly reducing electrodes contact area, and providing substantial conductive particles to keep on-state status, meanwhile insuring insulation between the electrodes. As far as the connection involving micro spaces, the ACAF is divided into connection layer, insulation layer and on-state layer, the anisotropic conductive is proportional to quantity of conductive particles at each of the protuberant electrodes. The connection layer, the insulation layer and the on-state layer of the ACAF are respectively stratified and insulated from one another, so the connection layer, insulation layer and on-state layer are respectively independent. Comparing to conventional ACF, the ACAF of the present application has high conductive particle efficiency, high electrode capturing efficiency, and low loss of conductive particles between electrodes. Due to thermal expansion coefficient of the ACAF between IC chips and substrates, mechanical inner stress derived therefrom is buffered, at the same time improving viscosity thereof. The ACAF can be applied for multiple layered components with improved sensitivity of the connection, punching free, Lead free, halogen free, and solder free.

BRIEF DESCRIPTION OF THE DRAWINGS

No drawing is presented.

DETAILED DESCRIPTION OF CERTAIN EMBODIMENTS

While the subject application will now be described in detail, it is done so in connection with the illustrative embodiments. It is intended that changes and modifications can be made to the described embodiments without departing from the true scope and spirit of the subject application as defined by the appended claims.

Basic formula for polymerization of the anisotropic conductive adhesive film of the present application is listed as follow:

tocopheroxyl, YP-70, 10-30 parts by weight;
novolac epoxy, selected from the group consisting of F-55, F-51 and F-44, 10-20 parts by weight;
acrylic rubbers, 10-20 parts by weight;
an elastic mixture, 5-10 parts by weight;
long chain imidazole derivatives, 0.75-5 parts by weight;
a monomer in the monomer layer, 5-10 parts by weight per 500 parts by the total weight of the anisotropic conductive adhesive film;
conductive particles, 30-40 parts by weight per 500 parts by total weight of the anisotropic conductive adhesive film;
a solvent, prepared by mixing toluene and ethyl acetate with a weight ratio of 4:6, and and a solution is prepared with the reactant thereof by a weight concentration of 20%-40%;
the density of solution with conductive particles is 1.2 g/cm3;
the solution viscosity under temperature of 25° C. is 5000-10000 mPa·S.

Preferred embodiment of the present application:
Processes for preparing the functional multilayer anisotropic conductive adhesive film of the present application, includes the following steps: mix the tocopheroxyl, YP-70, 20 parts by weight, and the solvent, 200 parts by weight in a reactor. Dissolve and stir in the reactor, and add novolac epoxy, 15 parts by weight. As the novolac epoxy completely dissolves, add elastic mixture, 5 parts by weight and continue stirring and dissolving. Add acrylic rubber, 20 parts by weight, and the solvent, 200 parts by weight, stirring and dissolving. Stand by for later use.

Put long chain imidazole derivative 3 parts by weight in a reactor, stirring for 2 hours under temperature of 50° C. Set aside for later use.

Prepare 5 μm conductive particles, 30 part by weight, with reference to the weight ratio of the anisotropic conductive adhesive film. A counting stirring apparatus stirs micro-encapsulating resin, and then combine conductive particles. Set aside for later use.

Prepare monomer solution, 10 parts by weight. Weight ratio of the copolymer is 10%. Set aside for later use.

All the stirring operations are carried out by a 3D multi-DOF stirring apparatus.

Then, coating processes are respectively carried out on an opal surface-treated polyester film under temperature of 100° C.-130° C.—120° C. for 6-8 minutes. The four layers are coated onto the opal surface-treated polyester film. Roll up the polyester film and slice the polyester film. Re-roll up the polyester film with 0.03 mm-0.015 mm width, and 50 meters long per roll of the ACAF.

In terms of the anisotropic conductive adhesive film obtained according to the preferred embodiment, parameters of FOG series after slicing the ACAF is listed as following:

Type: DBL SOFG200 Product: FOG
Thickness: 20 μm
Length: 50/100 m/roll
Width: 1.5 mm
Conductive particle material: particles surface gold plating
Density of conductive particles: 48 10 k/mm3
Minimum space capacity: 50 pitch
Conditions of preloading:
Temperature: 85° C.±5° C.
Pressure: 1.2 mpa
Time: 2 seconds
Loading condition:
Temperature: 187° C.
Pressure: 0.13 mPa
Time: 18 seconds
FOG outcome:
On-state resistance: 1.2Ω
Insulation resistance: 1012
Bonding intensity: 60 N/m
Storage time: 7 months/−10-5° C.
Pass rate: 99%

Alternative embodiment of the present application:
Processes for preparing functional multilayer anisotropic conductive adhesive film of the present application, includes the following steps: mix the tocopheroxyl, YP-70, 20 parts by weight, and the solvent, 200 parts by weight in a reactor. Dissolve and stir in the reactor and adding novolac epoxy, 15 parts by weight. As the novolac epoxy completely dissolves, add elastic mixture, 5 parts by weight and continuing stirring and dissolving. Add acrylic rubber, 20 parts by weight, and the solvent, 200 parts by weight, stirring and dissolving. Stand by for later use.

Put a long chain imidazole derivative 3 parts by weight in a reactor, stirring for 2 hours under temperature of 50° C. Set aside for later use.

Prepare 4 μm conductive particles, 30 part by weight, with reference to the weight ratio of the anisotropic conductive adhesive film. The micro-encapsulating resin is used for micro encapsulating the conductive particles. Set aside for later use.

Prepare a monomer solution, 10 parts by weight. Weight ratio of the copolymer is 20%. Set aside for later use.

All the stirring operations are carried out by a 3D multi-DOF stirring apparatus.

Then, coating processes are respectively carried out on an opal surface-treated polyester film under temperature of 100° C.-130° C.—135° C. for 6-8 minutes. The four layers are coated onto the opal surface-treated polyester film. Roll up the polyester film and slice the polyester film. Re-roll up the polyester film with 0.03 mm-0.015 mm width, and 50 meters long per roll of the ACAF.

In terms of the anisotropic conductive adhesive film obtained according to the alternative embodiment, parameters of COF series after slicing the ACAF is listed as following:

Type: DBL 40CT Product: COF
Thickness: 23 μm
Length: 50/100 m/roll
Width: 1.5-6 mm
Conductive particle size: 4 μm
Density of conductive particles: 130 10 k/mm3
Minimum space capacity: 30 pitch
Conditions of preloading:
Temperature: 85° C.±5° C.
Pressure: 1 mpa
Time: 5 seconds
Loading condition:
Temperature: 205° C.
Pressure: 50 mPa
Time: 16 seconds
COF outcome:
On-state resistance: >0.2Ω
Insulation resistance: 1012
Bonding intensity: 60 N/m
Storage time: 6 months/−10-5° C.
Pass rate: 99%

Third embodiment of the present application:

Processes for preparing functional multilayer anisotropic conductive adhesive film of the present application, includes the following steps: mix the tocopheroxyl, YP-70, 20 parts by weight, and the solvent, 200 parts by weight in a reactor. Dissolve and stir in the reactor and adding novolac epoxy, 15 parts by weight. As the novolac epoxy completely dissolves, add elastic mixture, 5 parts by weight and continue stirring and dissolving. Add acrylic rubber, 20 parts by weight, and the solvent, 200 parts by weight, stirring and dissolving. Stand by for later use.

Put a long chain imidazole derivative 3 parts by weight in a reactor, stirring for 2 hours under temperature of 50° C. Set aside for later use.

Prepare 3 μm conductive particles, 30 part by weight, with reference to the weight ratio of the anisotropic conductive adhesive film. The micro-encapsulating resin is used for micro encapsulating the conductive particles. Set aside for later use.

Prepare a monomer solution, 10 parts by weight. Weight ratio of the copolymer is 30%. Set aside for later use.

All the stirring operations are carried out by a 3D multi-DOF stirring apparatus.

Then, coating processes are respectively carried out on an opal surface-treated polyester film under temperature of 100° C.-130° C.—120° C. for 6-8 minutes. The four layers are coated onto the opal surface-treated polyester film. Roll up the polyester film and slice the polyester film. Re-roll up the polyester film with 0.03 mm-0.015 mm width, and 50 meters long per roll of the ACAF.

In terms of the anisotropic conductive adhesive film obtained according to the third embodiment, parameters of COG series after slicing the ACAF is listed as following:

Type: DBL-30CG Product: COG
Thickness: 30 μm
Length: 50/100 m/roll
Width: 1.5 mm
Conductive particle size: 3 μm
Density of conductive particles: 180 10 k/mm3
Minimum space capacity: 15 μm-20 μm
Conditions of preloading:
Temperature: 85° C.±5° C.
Pressure: 1 mpa
Time: 3 seconds
Loading condition:
Temperature: 210° C.
Pressure: 60 mPa
Time: 19 seconds
COG outcome:
On-state resistance: >0.1Ω
Insulation resistance: 1012
Bonding intensity: 60 N/m
Storage time: 5 months/−10-5° C.
Pass rate: 99%

First comparison example to the present application:

Processes for preparing functional multilayer anisotropic conductive adhesive film, includes the following steps: mix the tocopheroxyl, YP-70, 20 parts by weight, and the solvent, 200 parts by weight in a reactor. Dissolve and stir in the reactor and adding novolac epoxy, 15 parts by weight. Add acrylic rubber, 20 parts by weight, and the solvent, 200 parts by weight, stirring and dissolving. Stand by for later use.

Put a long chain imidazole derivative 3 parts by weight in a reactor, stirring for 2 hours under temperature of 50° C. Set aside for later use.

Prepare 5 μm conductive particles, 30 part by weight, with reference to the weight ratio of the anisotropic conductive adhesive film. The micro-encapsulating resin is used for micro encapsulating the conductive particles. Set aside for later use.

Prepare a monomer solution, 10 parts by weight. Weight ratio of the copolymer is 10%. Set aside for later use.

All the stirring operations are carried out by a 3D multi-DOF stirring apparatus.

Then, coating processes are respectively carried out on an opal surface-treated polyester film under temperature of 100° C.-130° C.—120° C. for 6-8 minutes. The four layers are coated onto the opal surface-treated polyester film. Roll up the polyester film and slice the polyester film. Re-roll up the polyester film with 0.03 mm-0.015 mm width, and 50 meters long per roll of the ACAF.

In the first comparison example, the styrene-butadiene rubber is excluded, and the monomer solution is adjusted. In terms of the anisotropic conductive adhesive film obtained according to the first comparison embodiment, parameters of FOG series after slicing the ACAF is listed as following:

Type: DBL SOFG200 Product: FOG
Thickness: 20 μm
Length: 50/100 m/roll
Width: 1.5 mm
Conductive particle material: conductive gold
Density of conductive particles: 48 10 k/mm3
Minimum space capacity: 50 pitch
Conditions of preloading:
Temperature: 85° C.±5° C.
Pressure: 1.2 mpa
Time: 2 seconds
Loading condition:
Temperature: 187° C.
Pressure: 0.13 mPa
Time: 18 seconds
FOG outcome:
On-state resistance: 1.0Ω
Insulation resistance: 1011
Bonding intensity: 30 N/m
Storage time: 5 months/−10-5° C.
Pass rate: 30%

Second comparison example to the present application:

Processes for preparing functional multilayer anisotropic conductive adhesive film, includes the following steps: mix the tocopheroxyl, YP-70, 20 parts by weight, and the solvent, 200 parts by weight in a reactor. Dissolve and stir in the reactor and adding novolac epoxy, 15 parts by weight. As the novolac epoxy completely dissolves, add elastic mixture, 5 parts by weight and continuing stirring and dissolving. Add acrylic rubber, 20 parts by weight, and the solvent, 200 parts by weight, stirring and dissolving. Stand by for later use.

Put a long chain imidazole derivative 3 parts by weight in a reactor, stirring for 2 hours under temperature of 50° C. Set aside for later use.

Prepare 4 μm conductive particles, 30 part by weight, with reference to the weight ratio of the anisotropic conductive adhesive film. The micro-encapsulating resin is used for micro encapsulating the conductive particles. Set aside for later use.

All the stirring operations are carried out by a 3D multi-DOF stirring apparatus.

Then, coating processes are respectively carried out on an opal surface-treated polyester film under temperature of 100° C.-130° C.—120° C. for 6-8 minutes. The four layers are coated onto the opal surface-treated polyester film. Roll up the polyester film and slice the polyester film. Re-roll up the polyester film with 0.03 mm-0.015 mm width, and 50 meters long per roll of the ACAF.

In the second comparison example, the monomer solution is excluded. In terms of the anisotropic conductive adhesive film obtained according to the Second comparison embodiment, parameters of COF series after slicing the ACAF is listed as following:

Type: DBL-40CT Product: COF
Thickness: 23 μm
Length: 50/100 m/roll
Width: 1.5-6 mm
Conductive particle size: 4 μm
Density of conductive particles: 130 10 k/mm3
Minimum space capacity: 30 pitch
Conditions of preloading:
Temperature: 85° C.±5° C.
Pressure: 1 mpa
Time: 5 seconds
Loading condition:
Temperature: 205° C.
Pressure: 1 mPa
Time: 5 seconds
COF out come:
On-state resistance: >0.7Ω
Insulation resistance: 108
Bonding intensity: 40 N/m
Storage time: 5 months/−10-5° C.
Pass rate: 90%

Third comparison example to the present application:

Processes for preparing functional multilayer anisotropic conductive adhesive film, includes the following steps: mix the tocopheroxyl, YP-70, 20 parts by weight, and the solvent, 200 parts by weight in a reactor. Dissolve and stir in the reactor and adding novolac epoxy, 15 parts by weight. As the novolac epoxy completely dissolves, add elastic mixture, 5 parts by weight and continue stirring and dissolving. Add the solvent, 200 parts by weight, stirring and dissolving. Stand by for later use.

Put a long chain imidazole derivative 3 parts by weight in a reactor, stirring for 2 hours under temperature of 50° C. Set aside for later use.

Prepare 3 μm conductive particles, 30 part by weight, with reference to the weight ratio of the anisotropic conductive adhesive film. The micro-encapsulating resin is used for micro encapsulating the conductive particles. Set aside for later use.

Prepare a monomer solution, 10 parts by weight. Weight ratio of the copolymer is 30%. Set aside for later use.

All the stirring operations are carried out by a 3D multi-DOF stirring apparatus.

Then, coating processes are respectively carried out on an opal surface-treated polyester film under temperature of 100° C.-130° C.—120° C. for 6-8 minutes. The four layers are coated onto the opal surface-treated polyester film. Roll up the polyester film and slice the polyester film. Re-roll up the polyester film with 0.03 mm-0.015 mm width, and 50 meters long per roll of the ACAF.

In the third comparison example, the acrylic rubber is excluded. In terms of the anisotropic conductive adhesive film obtained according to the third comparison embodiment, parameters of COG series after slicing the ACAF is listed as following:

Type: DBL-30CG Product: COG
Thickness: 30 μm
Length: 50/100 m/roll
Width: 1.5 mm
Conductive particle size: 3 μm
Density of conductive particles: 180 10 k/mm3
Minimum space capacity: 15 μm-20 μm
Conditions of preloading:
Temperature: 85° C.±5° C.
Pressure: 1 mpa
Time: 3 seconds
Loading condition:
Temperature: 210° C.
Pressure: 60 mPa
Time: 19 seconds
COG outcome:
On-state resistance: >0.1Ω
Insulation resistance: 1011
Bonding intensity: 10 N/m
Storage time: 7 days/−10-5° C.
Pass rate: 0

Having thus described particular embodiments of the application, various alterations, modifications, and improvements will readily occur to those skilled in the art. Such alterations, modifications and improvements as are made obvious by this disclosure are intended to be part of this description though not expressly stated herein, and are intended to be within the spirit and scope of the application. Accordingly, the foregoing description is by way of example only, and not limiting. The application is limited only as defined in the following claims and equivalents thereto.

What is claimed is:

1. A preparation method of functional multilayer anisotropic conductive adhesive film, adopting suspension polymerization means, comprising the following steps:

A, mixing and stirring tocopheroxyl, novolac epoxy, and a solvent;

B, adding elastic mixture of acrylic rubbers and styrene-butadiene rubbers into the admixture obtained from step A, stifling;

C, adding acrylic rubbers and additional solvent into the admixture obtained from step B, dissolving and stifling;

D, waiting as viscosity of the polymer obtained from step C naturally reduces to a degree that no more polymerization occurs, thus a coating material to be used for a resin layer obtained;

E, stifling long chain imidazole derivatives to form a coating material to be used for a reinforcing layer, which long chain imidazole derivatives are formed by 2,4-diamino-6[-2-undecyl imidazolyl(1)]-ethyl-cis-triazine, 1-cyanoethyl-2-undecyl-imidazole trimellitate and isocyanate derivative;

F, stifling a micro-encapsulating resin, and then combining conductive particles with said microencapsulating resin;

G, mixing butyl acrylate, methyl acrylate and glycol acrylate under presence of tetramethyl butyl peroxy-2-ethyl hexanoate to form a copolymer, after stirring and foam breaking, a coating material to be used for a copolymer layer obtained;

H, coating under temperature of 100° C.-135° C. to successively form the conductive particle layer, the resin layer, the reinforcing layer, and the copolymer layer on a polyester film, thereby obtaining the functional multilayer anisotropic conductive adhesive film.

2. The preparation method of functional multilayer anisotropic conductive adhesive film as in claim 1, wherein, the tocopheroxyl is present in an amount of 10-30 parts by weight;

the novolac epoxy is present in an amount of 10-20 parts by weight;

bulk density of the acrylic rubbers is 0.48±0.1g/cc, volatility<1.0%, Tg -30° C., solution viscosity under temperature of 25° C. is 5000-10000mPa.S, and the acrylic rubbers are present in an amount of 10-20 parts by weight;

wherein the styrene-butadiene rubbers in the elastic mixture have parameters as follows:

Mooney viscosity of natural rubber ML100° C. (1+4):45-55%, stretching stress 300%(35 minutes):14.1-18.6 MPa, tensile strength at a given elongation(35 minutes): >23.7 MPa, and elongation at break(35 minutes): >415%;

wherein the elastic mixture is present in an amount of 5-10 parts by weight;

wherein the long chain imidazole derivatives are present in an amount of 0.75-5 parts by weight;

wherein the diameter of the conductive particles is selected from the group consisting of 3.00_m±0.05, 3.25_m±0.05, 3.50_m±0.05, 3.75_m±0.05 and 4.00_m±0.05, and the content of the conductive particles is 30-40 parts by weight per 500 parts by total weight of the anisotropic conductive adhesive film;

wherein the content of said copolymer in the copolymer layer is 5-10 parts by weight per 500 parts by the total weight of the anisotropic conductive adhesive film, wherein weight ratio of the butyl acrylate, the methyl acrylate, the glycol acrylates, and the tetramethyl butyl peroxy-2-ethyl hexanoate is set in 7:3:2:1.

3. The preparation method of functional multilayer anisotropic conductive adhesive film as in claim 2, wherein the long chain imidazole derivatives in the reinforcing layer are obtained by the following processes: mixing 2,4-diamino-6-[-2-undecyl imidazolyl(1)]-ethyl-cis-triazine, and 1-cyanoethyl-2-undecyl-imidazole trimellitate with a weight ratio of 1:1, keeping them reacting for 3 hours, and then heating reactant from the mixing process up to 50° C., adding toluene-2,4-diisocyanate and a solvent into the reactant from the mixing process with a weight ratio of 0.8:60:30, and reacting for 5 hours.

4. The preparation method of functional multilayer anisotropic conductive adhesive film as in claim 2, wherein the thermal aging property of the elastic mixture is improved by steps of: mixing and preparing the acrylic rubbers and the styrenebutadiene rubbers with weight ratio of 10:5, and then physically admixing trace meta-alkaline reinforcing agent containing silica, silane coupling agent, and quaternary ammonium salt, in accordance with a weight ratio of 1:0.2:0.3.

5. The preparation method of functional multilayer anisotropic conductive adhesive film as in claim 2, wherein the solvent is obtained by mixing toluene and ethyl acetate with a weight ratio of 4:6, and a solution is prepared with the reactant thereof by a weight concentration of 20%-40%.

6. The preparation method of functional multilayer anisotropic conductive adhesive film as in claim 1, wherein the long chain imidazole derivatives in the reinforcing layer are obtained by the following processes: mixing 2, 4-diamino-6-[-2-undecyl imidazolyl(1)]-ethyl-cis-triazine, and 1-cyanoethyl-2-undecyl-imidazole trimellitate with a weight ratio of 1:1, keeping them reacting for 3 hours, and then heating reactant from the mixing process up to 50° C., adding toluene-2,4-diisocyanate and a solvent into the reactant from the mixing process with a weight ratio of 0.8:60:30, and reacting for 5 hours.

7. The preparation method of functional multilayer anisotropic conductive adhesive film as in claim 1, wherein the thermal aging property of the elastic mixture is improved by steps of: mixing and preparing the acrylic rubbers and the styrenebutadiene rubbers with weight ratio of 10:5, and then physically admixing trace meta-alkaline reinforcing agent containing silica, silane coupling agent, and quaternary ammonium salt, in accordance with a weight ratio of 1:0.2:0.3.

8. The preparation method of functional multilayer anisotropic conductive adhesive film as in claim 1, wherein the solvent is obtained by mixing toluene and ethyl acetate with a weight ratio of 4:6, and a solution is prepared with the reactant thereof by a weight concentration of 20%-40%.

* * * * *